Specification of Letters Patent.

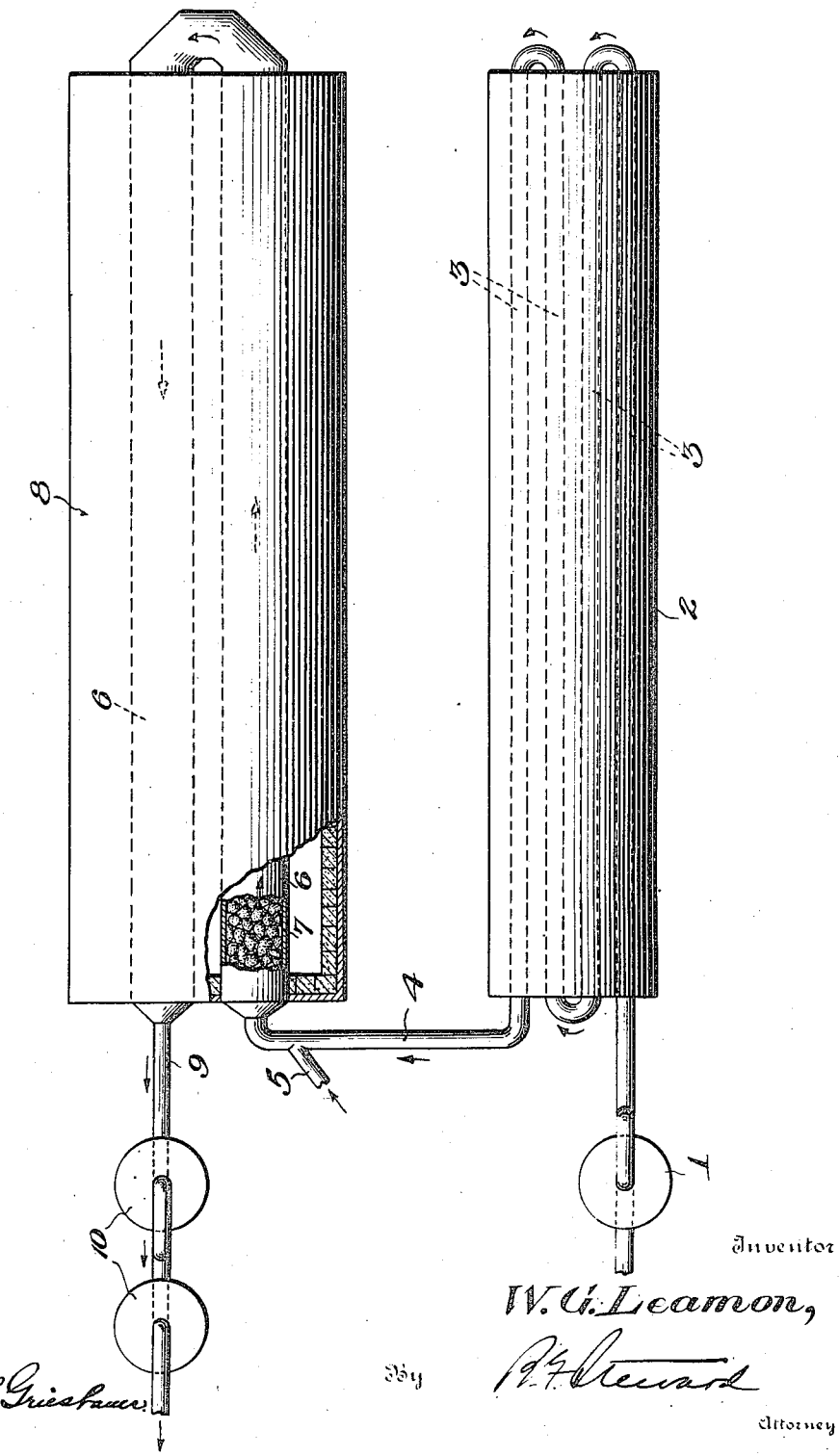

UNITED STATES PATENT OFFICE.

WILLIAM G. LEAMON, OF WOOSTER, OHIO.

METHOD OF TREATING GASES CONTAINING HYDROGEN SULFID.

1,317,583.
Specification of Letters Patent.
Patented Sept. 30, 1919.

Application filed November 8, 1917. Serial No. 200,925.

*To all whom it may concern:*

Be it known that I, WILLIAM G. LEAMON, a citizen of the United States, residing at Wooster, in the county of Wayne and State of Ohio, have invented certain new and useful Improvements in Methods of Treating Gases Containing Hydrogen Sulfid; and I do hereby declare the following to be a full, clear, and exact description of the invention, such as will enable others, skilled in the art to which it appertains to make and use the same.

This invention relates to methods of treating gases containing hydrogen sulfid; and it relates particularly to methods of eliminating hydrogen sulfid from fuel gases or other gases containing the same in relatively small proportions, wherein gas to be purified is subjected to the action of heat at a temperature sufficiently high to effect dissociation of the contained hydrogen sulfid, the treatment being best carried out in the presence of porous contact material which may or may not carry a more actively catalytic substance, and the conditions being such that the hydrogen of the hydrogen sulfid is oxidized to water by reaction with oxygen naturally contained in or added to the gas, while the sulfur either passes on through the purifying system as such to be mechanically removed as elemental sulfur by some suitable method, such as washing, or alternatively is also oxidized to a greater or less extent and removed by absorption in a suitable absorbing medium.

A principal object of the invention is to completely remove hydrogen sulfid from gases such as natural gas, coke oven gas, producer gas, illuminating gas, etc., in a simple, thorough and efficient manner and at a relatively small cost, the lime or iron oxid purifiers or other means for removing hydrogen sulfid, ordinarily considered indispensable for that purpose, being dispensed with either altogether or in part. While the present method is of general application, it is particularly adapted to purification of fuel gases of the general character above specified. It is also applicable to other fuel gases such as oil gas and the like.

In carrying out the new process in practice, the gas to be purified is ordinarily preheated either before or after the addition of a small proportion of air to a temperature of about 300° C., that is, to such temperature as will produce a relatively large degree of dissociation of hydrogen sulfid in the presence of the other gases comprised in the mixture, and is then led through a treating chamber filled with porous refractory material such as pumice, firebrick, broken pottery, etc. In this treating chamber a temperature at least as high as the preheating temperature is maintained. As a result the hydrogen sulfid present is dissociated rapidly and the hydrogen is oxidized to water, advantage being taken of the greater instability of hydrogen sulfid, as compared to the other constituents of a fuel gas, with rise in temperature. In practising the present process, it is usually most advantageous to separate and recover the sulfur as such. Accordingly where it is necessary to introduce air into the gas to be purified, the amount added is so regulated that comparatively little of the sulfur is oxidized, care being taken, however, that enough air is employed to secure complete oxidation of the hydrogen of the hydrogen sulfid, and thus to insure progress of the dissociating reaction in the forward direction. The part played by the pumice or other filling material in the treating chamber seems to be to absorb and condense upon its surface the hydrogen resulting from the dissociation of the hydrogen sulfid, and thus to favor rapid and effective oxidation thereof, without itself taking any part in the reaction either as a carrier or otherwise. In the best embodiment of my invention, therefore, the employment of an inert porous contact material in conjunction with a hydrogen sulfid dissociating temperature of pronounced efficiency is a highly important characteristic. The temperature prevailing in the treating chamber should be such that the free sulfur resulting from dissociation of the hydrogen sulfid is carried on with the treated gas either volatilized or suspended in finely divided condition and is finally caught in an appropriate treating apparatus, as for example a scrubbing system, where it accumulates and may be removed from time to time as a valuable byproduct.

The temperature in the reaction chamber may result wholly or in part from the exothermic character of the treating reaction, or, as is better practice in operating on a large scale, the treating chamber may be heated externally. In practice, a temperature of about 300° C. in the treating chamber, as above specified, is found to give excellent results with most gases containing small percentages of $H_2S$. Temperatures somewhat higher than this may be used but ordinarily to no advantage; and in any case the temperature should not be high enough to decompose the valuable gas constituents to a substantial extent. Temperatures lower than about 280° C. are not suitable because the elimination of $H_2S$ is not sufficiently complete. Even at 280° C., the results obtained are distinctly inferior to those obtained in operating at 300° C.

In order to illustrate by way of a concrete example the principles underlying the present process, but without intending thereby to limit the invention to the specific details recited, the application of my new process to the treatment of a natural gas will be explained in connection with the accompanying drawings in which a typical form of treating system or apparatus suitable for carrying out the process is illustrated in plan and more or less diagrammatically. A natural gas containing, for example, about 0.5% of $H_2S$ by volume, and under a normal existing pressure of about 15 inches of water, is led, if necessary, through a preliminary scrubber 1 to remove any dirt or solid particles carried by the gas which might collect in the treating tubes and obstruct the flow of gas through them, and thence into a preheater 2 which may take the form of a suitable furnace containing a series of heating tubes 3, consisting for example of a suitable number of iron pipes connected in series by bends. In this preheater, the temperature of the gas is raised to the desired point, in this instance about 300° C. The heated gas leaves the preheater by a pipe 4, and at 5 a volume of air equal to about 2½ times the volume of $H_2S$ contained in the gas is introduced, the mixture then passing to the treating chamber, which in this instance comprises iron tubes 6, filled with lumps of pumice or the like as indicated at 7, the tubes being inclosed in a suitable furnace 8. The oxidation reaction being exothermic, it should be possible theoretically to dispense with heating of the treating tubes; but in practice it is found that where large amounts of gas are to be treated, moderate external heating is desirable, as before stated, for the sake of uniformity in temperature throughout the treating chamber and to insure smoother progress of the reaction. Under the conditions assumed, the hydrogen of the hydrogen sulfid is selectively oxidized. A very small proportion of the sulfur is also oxidized; but the great bulk of the sulfur passes on as such in gaseous or vaporous form through the treating tubes, going thence with the hot gas mixture through the outlet pipe 9 to scrubbers 10 which may be tower scrubbers of any convenient type using water as the washing liquid. Passage of the hot gases directly to the scrubbers without preliminary cooling prevents undesirable reverse reactions and premature condensation of sulfur. In the scrubbers the sulfur is mechanically caught by the water and held suspended in finely divided form, being subsequently settled out of the wash liquor or filtered therefrom and recovered as a valuable by-product of the process.

Where the amount of gas treated is relatively small, it is possible entirely to dispense with the employment of a preheater, the necessary reaction temperature being attained in the treating tubes 6 which, as stated, are preferably externally heated to the proper reaction temperature in the furnace 8. Ordinarily it is better, however, to employ a preheater as this makes for more efficient and regular operation of the purifying system as a whole.

Under some circumstances the admixture with the gas of an oxidant such as air may also be omitted. This is the case where the composition of the gas to be treated is such that it contains enough oxygen or other constituent capable of reacting with $H_2S$ to render the addition of air unnecessary, or at least to permit the use of a smaller proportion of air. Thus, the process has been successfully applied to the treatment of a coke oven gas containing about 0.4% $H_2S$ by volume and substantially an equal volume of oxygen ($O_2$), the gas without addition of air being run directly through the treating tube as above described and the elimination of hydrogen sulfid being complete. In this particular case the treatment was carried far enough to crack the illuminants, of which about 4% were present, thus increasing the volume of the gas about 2.5%.

The filling material in the treating tubes or chambers may carry metal catalysts such as platinum, nickel, or the like. But where a metal catalyst of this character is employed, the reaction in the treating tubes proceeds somewhat differently, that is, instead of the hydrogen being oxidized first or selectively, the oxidation of both the hydrogen and sulfur of the dissociated hydrogen sulfid proceeds simultaneously. Under these circumstances it is evidently necessary to employ a larger proportion of air to effect complete oxidation of the hydrogen sulfid. Furthermore, the resultant sulfur dioxid must be removed by the subsequent treatment of the gas with an absorbing medium such as milk of lime, for example, or a large volume of water. In practice, it is simpler and usually better to treat the gas as first described, that is, to dissociate the hydrogen sulfid and to oxidize the hydrogen selectively, recovering the sulfur as such. But the employment of a metal catalyst is effective and very desirable in some cases.

Instead of introducing air into the gas to be treated an equivalent amount of pure oxygen can of course be employed.

In the specific example given above, 300° C. has been named as the proper temperature to which the gas should be preheated before entering the treating chamber.

This temperature has been found thoroughly satisfactory for practical purposes, the dissociation of hydrogen sulfid under the conditions in which it exists in gaseous mixtures of the character here in question being sufficient at that temperature to enable the oxidizing reaction to proceed rapidly and efficiently, without substantial destructive action on the other constituents of the mixture. For the purposes of this invention, the initial temperature of the gas mixture at the commencement of the oxidizing reaction in the treating tubes should not be substantially less than 280° C. The treating tubes should be of such length and capacity that the duration of the treating period is sufficiently long to insure the requisite degree of $H_2S$ elimination. Where necessary, the gas may be passed repeatedly through the treating tubes, or through additional tubes in series.

The reaction temperature prevailing in the major portion of the reaction tubes may be considerably higher than the initial temperature, but as before stated should not be permitted to become high enough to bring about substantial decomposition or deterioration of the valuable constituents of the fuel gas, a temperature of from 325° to 350° C. constituting a satisfactory upper limit in actual practice. The relatively long distance traveled by the gaseous mixture at this elevated temperature in passing through and among the fragments of porous contact material brings about a very complete oxidation of the hydrogen of the hydrogen sulfid. The usual tests for hydrogen sulfid show practically no trace of this impurity in the gases issuing from the reaction chamber.

If, in operating at the comparatively low temperatures specified above, the treating material eventually should become covered or impregnated with sulfur particles, it is only necessary to raise the temperature of the tubes for a brief interval to 448° C. or above to remove such sulfur. Or, wherever multiple units are provided, a small amount of air may be forced through one treating tube or unit without change of temperature. This will suffice to remove the sulfur by oxidation to $SO_2$ and does not necessitate disturbing the heating apparatus. After thus cleaning out the apparatus, the temperature is lowered to within the normal operating range.

Operating at relatively low temperatures is desirable and profitable as higher temperatures convert more sulfur to sulfur dioxid which causes loss of sulfur and necessitates the removal of the sulfur dioxid gas.

While the process is thoroughly effective and satisfactory when carried out at little or no pressure above atmospheric, I have found that the use of greater pressure, say from several atmospheres up to as high as 200 pounds or more per square inch, offers great advantages in expediting the reaction and forcing it to completion in a particularly effective manner. The beneficial effect extends beyond what would be expected theoretically from considerations of molecular concentration due to the higher pressures; so that pressure evidently has a specific favorable effect here which could not be foreseen. The employment of relatively high pressures of the magnitude specified is especially to be recommended in treating natural gas of the character found in southern Ontario and containing commonly 0.5 or 0.6 per cent $H_2S$. Where the normal pressure of the gas is insufficiently high, the gas may be passed through a compressor before entering the treating system proper.

It is to be understood that reference in the appended claims to a gas or gas mixture comprising or containing hydrogen sulfid and oxygen, or mixture of a gas with an oxidizing gas or gaseous oxidant, is intended to cover broadly either the case where oxygen is normally present in the gas to be treated, or the case where it is specially added thereto.

What I claim is:

1. The process of removing hydrogen sulfid from natural gas which comprises preheating the gas to about 300° C, mixing therewith a volume of air equal to about two and one-half times the volume of hydrogen sulfid contained in the gas, passing the mixture through a heated chamber containing fragments of pumice, while avoiding rise of temperature to a point where substantial decomposition of valuable constituents of the gas will occur, and treating the effluent gaseous mixture to recover free sulfur.

2. The process of removing hydrogen sulfid from fuel gases containing hydrogen sulfid and oxygen which comprises maintaining such a gas at a reacting temperature and under several atmospheres pressure until the desired oxidation of the hydrogen sulfid is effected, and then scrubbing the heated gas.

3. The process of purifying fuel gases which comprises preheating a fuel gas containing below 1 per cent. of hydrogen sulfid to a temperature not substantially less than 280° C., passing the preheated gas into contact with porous refractory material and there subjecting it in the presence of a gaseous oxidant to heat at a temperature of at least 280° C. to effect oxidation of hydrogen sulfid while avoiding substantial destruction of the valuable gas constituents, and separating a resultant sulfur-containing reaction product, thereby obtaining fuel gas substantially free of hydrogen sulfid.

In testimony whereof I hereunto affix my signature.

WILLIAM G. LEAMON.